United States Patent

[11] 3,613,786

| [72] | Inventors | Stanley C. Jones<br>Littleton;<br>Wayne O. Roszelle, Littleton; Marvin A. Svaldi, Morrison, all of Colo. |
|---|---|---|
| [21] | Appl. No. | 22,087 |
| [22] | Filed | Mar. 23, 1970 |
| [45] | Patented | Oct. 19, 1971 |
| [73] | Assignee | Marathon Oil Company<br>Findlay, Ohio |

[54] OIL RECOVERY METHOD USING HIGH WATER CONTENT OIL-EXTERNAL MICELLAR DISPERSIONS
22 Claims, No Drawings

[52] U.S. Cl. .................................................... 166/273, 166/275
[51] Int. Cl. ............................................... E21b 43/22
[50] Field of Search ........................................... 166/273, 274, 275; 252/8.55 D

[56] References Cited
UNITED STATES PATENTS

| 3,493,048 | 2/1970 | Jones .......................... | 166/275 X |
| 3,497,006 | 2/1970 | Jones et al. .................. | 166/273 |

*Primary Examiner*—Stephen J. Novosad
*Attorneys*—Joseph C. Herring, Richard C. Willson and Jack L. Hummel ABSTRACT: Crude oil within a subterranean formation is recovered by injecting into the formation a novel high water content oil-external micellar dispersion (containing 55 to about 90 percent water) and moving the micellar dispersion through the formation to displace crude oil. The micellar dispersion contains a surfactant having an average equivalent weight of about 350 to about 525.

OIL RECOVERY METHOD USING HIGH WATER CONTENT OIL-EXTERNAL MICELLAR DISPERSIONS

BACKGROUND OF THE INVENTION

1. Field of the Invention

This invention relates to flooding reservoirs with micellar dispersion to recover hydrocarbon. The micellar dispersions are oil-external, contain 55–90 percent water, hydrocarbon, surfactant, and optionally cosurfactant and/or electrolyte.

2. Description of the Prior Art

Oil-external micellar dispersions are useful in secondary-type recovery. U.S. Pat. No. 3,254,714 to Gogarty et al. teaches the use of a microemulsion containing up to about 43 percent water in the recovery of crude oil. U.S. Pat. No. 3,307,628 to Sena suggests that a microemulsion containing 55 percent water can be effected if the water soluble surfactant and an oil soluble surfactant are present in the correct ratios.

U.S. Pat. No. 3,497,006 teaches that oil-external micellar dispersions containing from 55 percent up to about 90 percent water can be effected and used at 1–20 percent formation pore volumes to recover crude oil in a secondary-type recovery process. The surfactant useful in these dispersions can have a molecular weight of about 350 to about 520.

SUMMARY OF THE INVENTION

The micellar dispersions of this invention are oil-external and contain at least 55 percent water. Water concentrations up to about 90 percent are useful with this invention. These high water content oil-external micellar dispersions are useful to recover crude oil in a secondary-type recovery process. The surfactant in the micellar dispersion has an average equivalent weight of about 350 to about 525.

DESCRIPTION OF PREFERRED EMBODIMENTS OF INVENTION

Secondary-type oil recovery process, as used herein, includes a tertiary recovery process. The term "micellar dispersion" as used herein is meant to include micellar solutions, "microemulsions" [Schulman and Montagne, *Annals of the New York Academy of Sciences*, 92, pgs. 366–371 (1961)], "transparent" emulsions (Blair, Jr. et al. U.S. Pat. No. 2,356,205) and micellar dispersion technology taught by C. G. Sumner, Clayton's, *The Theory of Emulsions and Their Technical Treatment*, 5th Edition, pp. 315–320 (1954). Micellar dispersions differ from emulsions in many ways, the strongest differentiation being that the former are thermodynamically stable whereas the latter are not.

The micellar dispersions of this invention are oil-external. That is, the hydrocarbon component of the micellar dispersion is external to the aqueous component.

The micellar dispersion contains hydrocarbon, aqueous medium (e.g. water, brackish water and brine water), surfactant sufficient to impart desired characteristics to the dispersion, cosurfactant, and optionally electrolyte. Examples of volume amounts are about 4 to about 40 percent hydrocarbon, about 55 to about 90 percent aqueous medium, at least about 4 percent surfactant, about 0.01 to about 5 percent by weight of electrolyte. In addition, the micellar dispersion and/or subsequent slugs can contain corrosion-inhibiting agents, bactericides, etc.

Examples of hydrocarbon include crude oil (both sweet and sour), partially refined fractions of crude oil and refined fractions thereof, e.g. side cuts from crude oil columns, crude column overheads, straight run gasoline, and liquefied petroleum gases. Synthesized hydrocarbons and unreacted hydrocarbon with petroleum sulfonates are also useful. Preferably, the hydrocarbon is crude oil or partially refined fractions thereof.

The aqueous medium can be soft water, brackish water or brine water. Preferably, the water is soft but it can contain small amounts of salts which are characteristic of the subterranean formations being flooded.

Surfactants useful with the dispersions include nonionic, cationic, and anionic surfactants. Examples of useful surfactants include those defined in U.S. Pat. No. 3,493,048 to Jones. The surfactant has an average equivalent weight of about 350 to about 525 and preferably about 390 to about 470. Equivalent weight is defined as the molecular weight of the surfactant molecule divided by the number of functional groups, such as sulfonate, sulfonic acid groups, etc. attached to the molecule. Preferably, the surfactant is a petroleum sulfonate, also known as alkyl aryl naphthenic sulfonate, and preferably containing a monovalent cation. Examples of preferred surfactants are the sodium and ammonium petroleum sulfonates having an average equivalent weight of about 350 to about 525, and more preferably about 390 to about 470.) The surfactant can be a mixture of two or more low, medium, and high average equivalent weight sulfonates or a mixture of two or more different surfactants.

The cosurfactants or cosolubilizers useful with the invention can be partially water soluble. However, cosurfactants having zero to infinite water solubility are useful. Preferably, they have limited water solubility of about 0.01 to about 20 percent, and more preferably about 1 to about 5 percent at ambient temperature. Examples of cosurfactants include alcohols, amides, amino compounds, esters, aldehydes, ketones, and like compounds containing 1 up to about 20 or more carbon atoms and more preferably about 3 to about 16 carbon atoms. The cosurfactant is preferably an alcohol, e.g. isopropanol, n- and isobutanol, the amyl alcohols such as n-amyl alcohol, 1- - and 2-hexanol, 1- and 2-octanol, decyl alcohols, alkaryl alcohols such as p-nonyl phenol, alcoholic liquors such as fusel oil, hydroxy compounds like 2-butoxyethanol, etc. Particularly useful alcohols include the primary butanols, primary pentanols and primary and secondary hexanols. Concentrations to about 0.01 percent to about 20 percent by volume of cosurfactant are useful in the micellar dispersion and more preferably about 0.01 to about 5.0 percent. Mixtures of two or more cosurfactants are useful.

Electrolytes are useful within the oil-external micellar dispersions. Examples of such electrolytes include inorganic bases, inorganic acids, inorganic salts, organic bases, organic acids, and organic salts which are strongly or weakly ionized. Preferably, the electrolytes are inorganic bases, inorganic acids, and inorganic salts, e.g., sodium hydroxide, sodium chloride, sodium sulfate, hydrochloric acid, sulfuric acid, and sodium nitrate. Examples of other useful electrolytes can be found in U.S. Pat. No. 3,330,343. The type and concentration of electrolyte will depend on the aqueous medium, surfactant, cosurfactant, hydrocarbon, and the reservoir temperature. Generally from about 0.001 to about 5 percent by weight of electrolyte is useful. The electrolyte can be the salts within brackish or brine water.

The mobility of the oil-external micellar dispersion is desirably about equal to or less than the mobility of the formation fluids (i.e. combination of crude oil and interstitial water) ahead of the dispersion. Preferably, the micellar dispersion has a mobility favorable to protecting against viscous instability.

Size of the micellar dispersion slug useful with this invention is from about 1 to about 20 percent or more formation pore volume. Larger pore volumes are useful but such may be economically unattractive. More preferably, about 2 to about 10 percent formation pore volumes are useful and about 3 to about 6 percent formation pore volumes give very efficient results.

The size of the mobility buffer (also identified as the front portion of the drive material) can vary from about 5 up to about 75 percent formation pore volume and more preferably is about 25 to about 60 percent formation pore volume. However, this volume can be adjusted, i.e. increased or decreased, to satisfy the particular reservoir being flooded.

The mobility buffer should have the proper mobility to protect against the water drive readily invading the micellar dispersion, i.e., to reduce fingering tendency of the water into the micellar dispersion. Preferably, the mobility of the mobility buffer is about equal to or less than that of the micellar dispersion. From about 5 to about 100 percent of the mobility buffer can have graded mobilities from a low of the micellar dispersion to a high of the water drive.

After the mobility buffer is injected into the subterranean formation, sufficient water drive is injected to move or displace the micellar dispersion and mobility buffer toward a production well in fluid communication with the subterranean reservoir. Displaced crude oil is recovered at the production well.

The following examples are presented to illustrate working embodiments of the invention. Unless otherwise specified, percents are based on volume.

EXAMPLE 1

This example is presented to show that different components within the micellar dispersion and different amounts thereof can be used to obtain stable oil-external micellar dispersions. Examples indicated in table I are prepared at room temperature with minimal agitation. The compositions of the micellar dispersions are indicated in table I.

EXAMPLE 2

Fired Berea sandstone cores 4 feet long by 3 inches in diameter are saturated with distilled water containing 18,000 p.p.m. of sodium chloride, flooded to irreducible water saturation with Henry crude oil (a sweet, black oil having a viscosity of about 7 cp. at 72°F.) and then reduced to residual oil saturation by waterflooding with Henry plant water. The characteristics of the cores are indicated in table III. Thereafter, there is injected into the core table III indicated percent formation pore volumes of micellar dispersion. The compositions of these micellar dispersions are given in table II:

TABLE II.—MICELLAR DISPERSION COMPOSITION

| Sample: | Hydrocarbon (crude oil) (percent) | Surfactant (petroleum sulfonate [percent]) | Water (percent) | Cosurfactant (percent) |
|---|---|---|---|---|
| A | 28.70 | 9.10 | 60.73 (60PW/40HPW) | 0.99 NAA; 0.48 IPA |
| B | 28.52 | 8.75 | 61.00 (60PW/40HPW) | 1.26 PAA; 0.47 IPA |
| C | 18.07 | 8.60 | 71.50 (PW) | 1.77 NAA; .06 IPA |
| D | 12.93 | 8.70 | 76.06 (PW) | 2.25 NAA; .06 IPA |
| E | 9.20 | 8.74 | 80.72 (60PW/40HPW) | 0.89 NAA; 0.45 IPA |

Legend:
In the water column HPW is Henry plant water and PW is Palestine water
NAA is n-amyl alcohol
IPA is isopropanol
PAA is primary amyl alcohol.

TABLE I

| Sample | Surfactant Percent | Surfactant Type | Hydrocarbon Percent | Hydrocarbon Type | Aqueous medium Percent | Aqueous medium Type | Cosurfactant Ml./100 ml. | Cosurfactant Type |
|---|---|---|---|---|---|---|---|---|
| A | 5.2 | Ammonium petroleum sulfonate (average eq. wt.=440, 81% active). | 24.75 | Crude Oil | 70 | 60% Henry plant water, 40% Palestine water. | 0.08 / 0.25 | n-Amyl alcohol. / Isopropanol. |
| B | 10 | "Pyronate 50" | 20 | do | 70 | do | 3.25 | n-Hexanol. |
| C | 10 | "Petronate L" | 20 | Straight-run gasoline | 70 | do | 4.24 | n-Amyl alcohol. |
| D | 20 | "Duponol WAQE" | 10 | do | 70 | Distilled water | 14 | i-Amyl alcohol. |
| E | 10 | "Energetic W-100" | 20 | do | 70 | do | 8.5 | Do. |
| F | 10 | "Triton X-100" | 20 | do | 70 | do | 5.5 | Do. |
| G | 20 | "Arquad 12-50" | 10 | do | 70 | do | 17.0 | Do. |
| H | 16.6 | Sodium petroleum sulfonate (avg. eq. wt.=465; 62% active). | 16.6 | do | 66.6 | do | 1.3 | Isopropanol. |
| I | 10 | Ammonium petroleum sulfonate (avg. eq. wt.=440; 81% active). | 5 | Crude oil | 85 | 60% Palestine water, 40% Henry plant water. | 2.5 | n-Amyl alcohol. |
| J | | Ammonium petroleum sulfonate (100% active): | | | | | | |
| (a) | 8 | Avg. eq. wt.=406 | | Crude oil | 70 | Distilled water | 1 | p-Hexanol. |
| (b) | 8 | Avg. eq. wt.=410 | | do | 70 | do | 1 | Do. |
| (c) | 8 | Avg. eq. wt.=420 | | do | 70 | do | 3 | p-Amyl alcohol. |
| (d) | 8 | Avg. eq. wt.=425 | | do | 70 | do | 3 | Do. |
| (e) | 8 | Avg. eq. wt.=438 | | do | 70 | do | 3 | Do. |
| K | | Ammonium petroleum sulfonate (100% active): | | | | | | |
| (a) | 6.98 | Avg. eq. wt.=351 | 32.52 | Crude oil plus vehicle oil in sulfonate. | 60 | do | 2.5 | p-Hexanol. |
| (b) | 7.26 | Avg. eq. wt.=365 | 32.24 | do | 60 | do | 2.32 | Do. |
| (c) | 7.64 | Avg. eq. wt.=384 | 31.86 | do | 60 | do | 0.74 | Do. |
| (d) | 7.90 | Avg. eq. wt.=397 | 31.60 | do | 60 | do | 0.40 | Do. |
| (e) | 8.14 | Avg. eq. wt.=409 | 31.36 | do | 60 | do | 0.54 | Do. |
| (f) | 8.22 | Avg. eq. wt.=413 | 31.28 | do | 60 | do | | |
| (g) | 8.62 | Avg. eq. wt.=433 | 30.88 | do | 60 | do | | |
| (h) | 8.87 | Avg. eq. wt.=446 | 30.63 | do | 60 | do | 0.90 | p-Hexanol. |

Legend.—(1) Pyronate 50, a sodium petroleum sulfonate; average equivalent weight 350; sold by Sonneborn Chemical Co., 300 Park Avenue South, New York, New York, 10010; (2) Petronate L, a sodium petroleum sulfonate, average equivalent weight 422; sold by Sonneborn Chemical Co.; (3) Henry plant water is obtained from the Henry lease in Illinois; contains about 18,000 p.p.m. of dissolved salts and hereinafter is identified as Henry plant water; (4) Palestine water is obtained from the Palestine water reservoir in Palestine, Illinois; contains about 420 p.p.m. of dissolved salts and hereinafter is identified as Palestine water.

NOTE.—The amount of cosurfactant is based on ml. of cosurfactant per 100 ml. of liquid containing surfactant, hydrocarbon, and aqueous medium. "K" compositions are based on weight percent and contain 0.50 wt. percent of $(NH_4)_2SO_4$, except the cosurfactant is based on ml./100 ml.

The micellar dispersions are followed by the injection of 1.2 pore volumes of a mobility buffer slug composed of 1,200 p.p.m. of No. 530 Pusher (a high molecular weight partially hydrolyzed polyacrylamide marketed by Dow Chemical Company), 1 percent fusel oil, and the residue Palestine water. Flooding of the core samples is effected at 72° F., results of the flooding tests are indicated in table III:

TABLE III

| Sample | Core characteristics | | | Micellar dispersion | | Percent crude oil recovery |
|---|---|---|---|---|---|---|
| | Effective porosity (percent) | Permeability (md.) | Residual oil saturation (percent) | Type | Percent formation pore volume injected | |
| A-1 | 17.6 | 114 | 30.7 | A | 1 | 40.3 |
| A-2 | 17.9 | 114 | 37.1 | A | 2 | 81.2 |
| A-3 | 20.1 | 561 | 34.4 | A | 4.1 | 91.5 |
| B-1 | 22.1 | 855 | 35.9 | B | 5 | 89.9 |
| C-1 | 18.8 | 165 | 36.6 | C | 2.5 | 90.9 |
| D-1 | 17.2 | 72 | 37.3 | D | 2 | 60.9 |
| D-2 | 18.7 | 154 | 36.1 | D | 5 | 100.0 |
| E-1 | 21.1 | 642 | 35.9 | E | 5 | 82.7 |

EXAMPLE 3

The procedure of example 22 is repeated using 2 percent pore volume of micellar dispersion J–a through J–e defined in table I. Results of the flooding tests are:

| Micellar Dispersion | % Recovery of Oil in Place in 4 ft. × 3 in. cores |
|---|---|
| J–a | 91.5 |
| J–b | 83.9 |
| J–c | 90.4 |
| J–d | 89.5 |
| J–e | 85.4 |

The invention is not to be limited by the above examples. Rather, variations and modifications apparent to those skilled in the art are meant to be included within the scope of this invention as defined in the specification and claims.

What is claimed is:

1. A process of recovering crude oil from an oil-bearing subterranean formation having at least one injection means in fluid communication with at least one production means, comprising injecting into the formation an oil-external micellar dispersion comprised of about 55 to about 90 percent by volume of water, a surfactant having an average equivalent weight within the range of about 350 to about 525, and displacing said micellar dispersion toward the production means and recovering crude oil through the production means.

2. The process of claim 1 wherein the micellar dispersion is comprised of hydrocarbon, water, and petroleum sulfonate.

3. The process of claim 2 wherein the micellar dispersion contains cosurfactant and/or electrolyte.

4. The process of claim 1 wherein about 1 to about 20 percent formation pore volume of the micellar dispersion is injected into the formation.

5. The process of claim 1 wherein the micellar dispersion contains at least about 4 percent surfactant.

6. The process of claim 1 wherein a mobility buffer is injected into the formation after the micellar dispersion is injected therein.

7. The process of claim 6 wherein the mobility buffer has a mobility about equal to or less than about the mobility of the micellar dispersion.

8. The process of claim 6 wherein a water drive is injected into the subterranean formation after the mobility buffer to displace the micellar dispersion and mobility buffer toward the production means.

9. The process of claim 1 wherein the micellar dispersion has a mobility about equal to or less than about the mobility of the formation fluids flowing ahead of the micellar dispersion within the subterranean formation.

10. A process of recovering crude oil from an oil-bearing subterranean formation having at least one injection means in fluid communication with at least one production means, comprising:
 1. injecting an oil-external micellar dispersion comprised of about 4 to about 40 percent hydrocarbon, about 55 to about 90 percent water, at least about 4 percent surfactant having an average equivalent weight within the range of about 350 to about 525, and about 0.01 to about 20 percent cosurfactant, the percents based on volume, then
 2. injecting a mobility buffer into the subterranean formation, and
 3. injecting sufficient water drive into the subterranean formation to displace the micellar dispersion and mobility buffer toward the production means and recovering crude oil through the production means.

11. The process of claim 10 wherein about 1 to about 20 percent formation pore volume of the micellar dispersion is injected into the subterranean formation.

12. The process of claim 11 wherein about 2 to about 10 percent formation pore volume of the micellar dispersion is injected into the subterranean formation.

13. The process of claim 10 wherein the micellar dispersion has a mobility about equal to or less than about the mobility of the formation fluids flowing ahead of the micellar dispersion within the subterranean formation.

14. The process of claim 10 wherein about 5 to about 75 percent formation pore volume of the mobility buffer is injected into the subterranean formation.

15. The process of claim 10 wherein the mobility buffer has a mobility about equal to or less than the mobility of the back portion of the micellar dispersion.

16. The process of claim 10 wherein about 5 to 100 percent of the mobility buffer is characterized as having graded mobilities increasing from front to rear from about the mobility of the micellar dispersion to about the mobility of the water drive.

17. The process of claim 10 wherein the mobility buffer is characterized as having an average mobility between about the mobility of the micellar dispersion and about the mobility of the water drive.

18. A process of recovering crude oil from an oil-bearing subterranean formation having at least one injection means in fluid communication with at least one production means, comprising:
 1. injecting into the formation 1 to about 20 percent formation pore volume of a micellar dispersion comprised of about 4 to about 40 percent by volume of hydrocarbon, at least about 4 percent by volume of petroleum sulfonate having an average equivalent weight within the range of about 350 to about 525, about 55 to about 90 percent by volume of water, about 0.01 to about 20 percent by volume of cosurfactant(s) containing about 3 to about 20 carbon atoms, and about 0.001 to about 5 percent by weight of electrolyte, then,
 2. injecting into the formation about 5 to about 75 percent formation pore volume of a mobility buffer and,
 3. injecting sufficient water drive into the formation to displace the micellar dispersion and mobility buffer toward the production means and recovering crude oil through the production means.

19. The process of claim 18 wherein the mobility of the micellar dispersion is about equal to or less than about the mobility of the formation fluids within the subterranean formation.

20. The process of claim 18 wherein about 5 to about 100 percent of the mobility buffer is characterized as having mobilities increasing from a low of about the mobility of the micellar dispersion to a high of about the mobility of the water drive.

21. The process of claim 18 wherein the front portion of the mobility buffer has a mobility about equal to or less than the mobility of the back portion of the micellar dispersion.

22. The process of claim 18 wherein the cosurfactant is an alcohol.

UNITED STATES PATENT OFFICE
CERTIFICATE OF CORRECTION

Patent No. 3,613,786                    Dated  October 19, 1971

Inventor(s)   Stanley C. Jones et al.

It is certified that error appears in the above-identified patent and that said Letters Patent are hereby corrected as shown below:

Column 1, line 60, after "about" third occurrence, insert -- 20% of the cosurfactant and about 0.001% to about --. Column 5, line 23, "22" should read -- 2 --.

Signed and sealed this 4th day of April 1972.

(SEAL)
Attest:

EDWARD M. FLETCHER, JR.　　　　　　　　ROBERT GOTTSCHALK
Attesting Officer　　　　　　　　　　　Commissioner of Patents